W. G. NAUGHTON.
FENDER.
APPLICATION FILED SEPT. 30, 1911.
1,028,056.
Patented May 28, 1912.
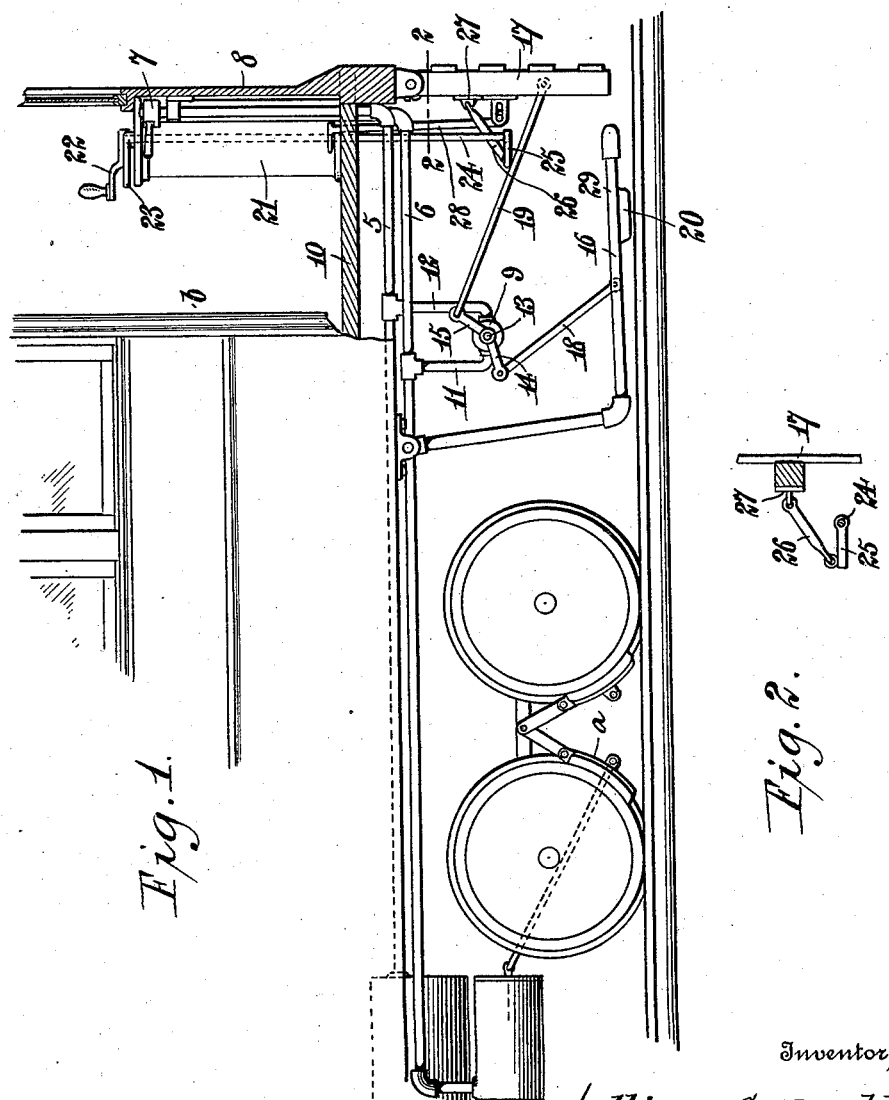
Witnesses:—
Christ Feinle, Jr.,
John A. Dohugan.
Inventor,
William G. Naughton,
By Victor J. Evans,
Attorney.

UNITED STATES PATENT OFFICE.

WILLIAM G. NAUGHTON, OF PHILADELPHIA, PENNSYLVANIA.

FENDER.

1,028,056.

Specification of Letters Patent. Patented May 28, 1912.

Application filed September 30, 1911. Serial No. 652,182.

*To all whom it may concern:*

Be it known that I, WILLIAM G. NAUGHTON, a citizen of the United States, residing at Philadelphia, in the county of Philadelphia and State of Pennsylvania, have invented new and useful Improvements in Fenders, of which the following is a specification.

The invention has for its general object the provision of a device intended for use with trolley cars, and adapted to operate automatically upon impact with an object on the track, to apply the brakes and throw the reversing mechanism of the car.

Other objects will appear and be better understood from the following description taken in connection with the accompanying drawings, in which,—

Figure 1 is a side elevation partly in section of the forward portion of a car provided with my improved device. Fig. 2 is a detail horizontal section of the connection between the buffer frame and shaft which operates the reversing mechanism and taken approximately on the line 2—2 of Fig. 1.

The fluid pressure brake system $a$ herein shown as applied to the car $b$ is of well-known construction and includes the line made up of the pipes 5 and 6 which connect with the controlling valve 7 located adjacent to the dash 8. The car $b$ is of the well-known electric type and is shown merely to illustrate one application of my invention. A second or supplemental controlling valve 9 is arranged below the floor 10 of the car and is connected to the pipes 5 and 6 by means of pipes 11 and 12. The stem 13 of the valve 9 has an operating stem in the form of a bell crank lever, the arms 14 and 15 of which are respectively connected with the fender 16 and buffer frame 17 by means of links 18 and 19. The fender 16 is supported from the floor 10 of the car and is adapted to swing. The opposite sides of this fender overlie the rails and carry permanent magnets 20 which are normally spaced from the rails. The buffer frame, by virtue of its link and lever connection with the fender serves, in addition to a purpose to be described later, to hold the fender 16 so that the magnets thereof will be slightly spaced from the rails.

The controller box 21 arranged adjacent to the dash 8 has the usual controlling lever 22 and also a reversing lever 23. This mechanism, with the exception of the reversing lever 23, is of well-known construction and forms no part of the present invention; therefore, a detail description of the same need not be given. The shaft 24 connected to the reversing lever 23 extends through the floor 10 of the car and is provided at its lower end with a crank arm 25. A link 26 connects the crank arm 25 with a bracket 27 carried by the buffer frame 17 and is adapted to turn the shaft 24 and also the reversing lever 23 when the buffer frame swings inwardly, this turning of the reversing lever having the effect of reversing the current and likewise the power mechanism, whereby the car is caused to move rearwardly.

A plunger 28 extends through the floor 10 of the car and moves upwardly when the buffer frame swings inwardly so that by depressing this plunger the buffer frame is moved outwardly and the parts connected thereto restored to their normal positions.

In Fig. 1 the parts are shown in their normal positions and it will be manifest that when an object strikes the buffer frame, the latter will swing inwardly, and as it does so the reversing mechanism will be operated in the manner previously described and the controlling valve 9 operated through the link 19 so as to permit the air to actuate the brakes in the ordinary manner. It will be seen that during this movement of the parts the arm 14 of the bell crank will move downwardly, thereby lowering or swinging rearwardly the horizontal portion 29 of the fender 16 until the magnets 20 thereof contact with the rails. This contact between the magnets and track will serve to prevent the accidental lifting or swinging forwardly of the fender 16, thus preventing the object struck by the buffer frame from being passed over by the fender and by the wheels before the car shall have been brought to a standstill.

Although I have shown and described one embodiment of my invention it is to be understood that I am not to be limited to the specific structure nor to the particular arrangement of the parts herein described and claimed since it will be seen that various changes may be made, in the scope of the appended claim without departing from the spirit or sacrificing any of the advantages of the invention.

What I claim as new is:—

In combination with a car, a fluid pressure brake system therefor including a controlling valve and reversing mechanism including a reversing lever; of a fender pivoted to the car, a movable buffer frame pivotally connected to the car and arranged in front of the fender, means connecting the controlling valve with the fender and buffer frame and serving to support the fender in spaced relation to the track and to operate the controlling valve upon movement of the fender or buffer frame, and a connection between the reversing lever and buffer frame, for the purpose set forth.

In testimony whereof I affix my signature in presence of two witnesses.

WILLIAM G. NAUGHTON.

Witnesses:
CHARLES TIEFENTHALER,
GEORGE E. NAUGHTON.

Copies of this patent may be obtained for five cents each, by addressing the "Commissioner of Patents, Washington, D. C."